July 29, 1958  E. G. HILL  2,845,147
BOOSTER BRAKE MECHANISM
Filed Oct. 13, 1955  2 Sheets-Sheet 2
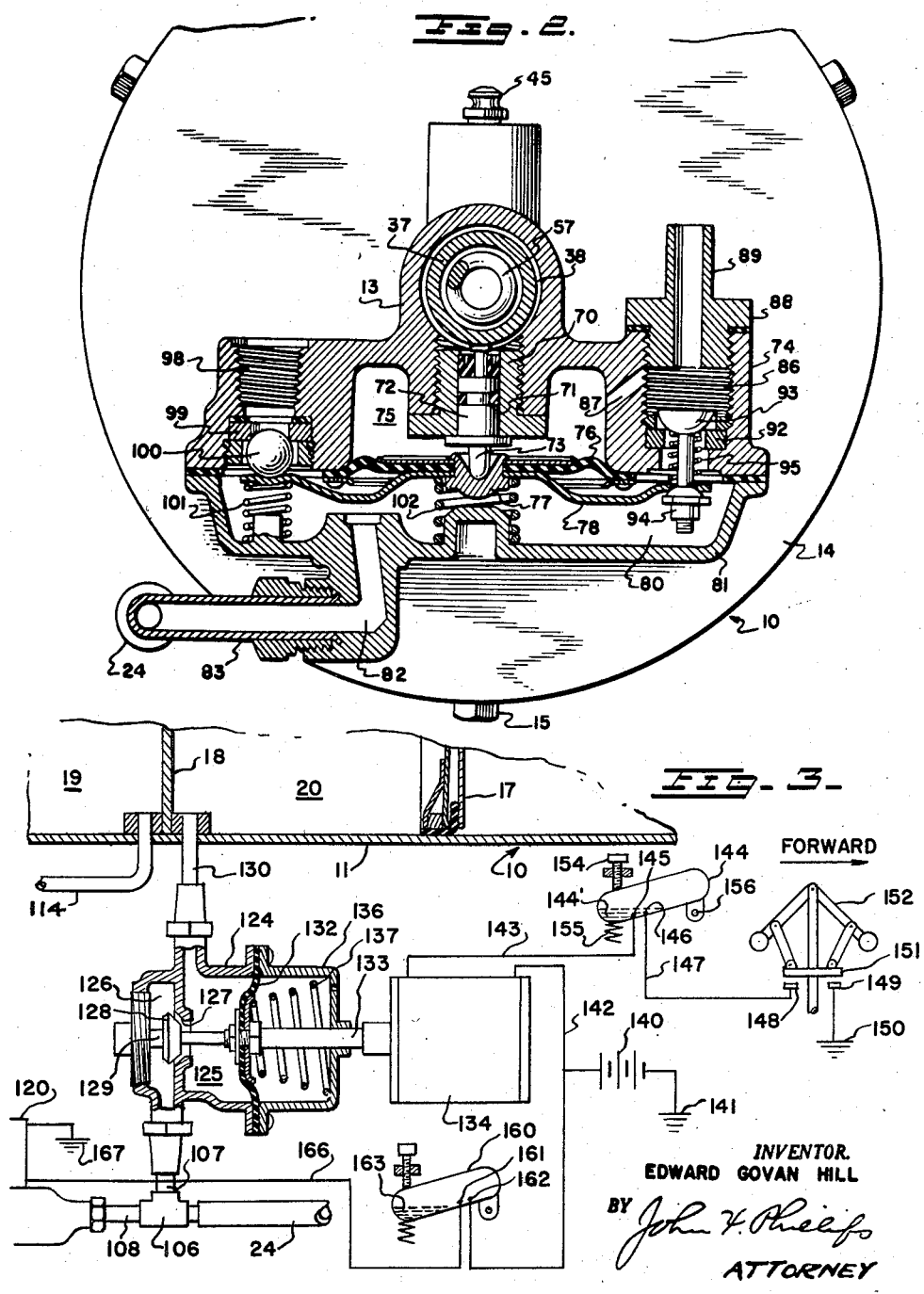
INVENTOR.
EDWARD GOVAN HILL
BY John F. Phillips
ATTORNEY

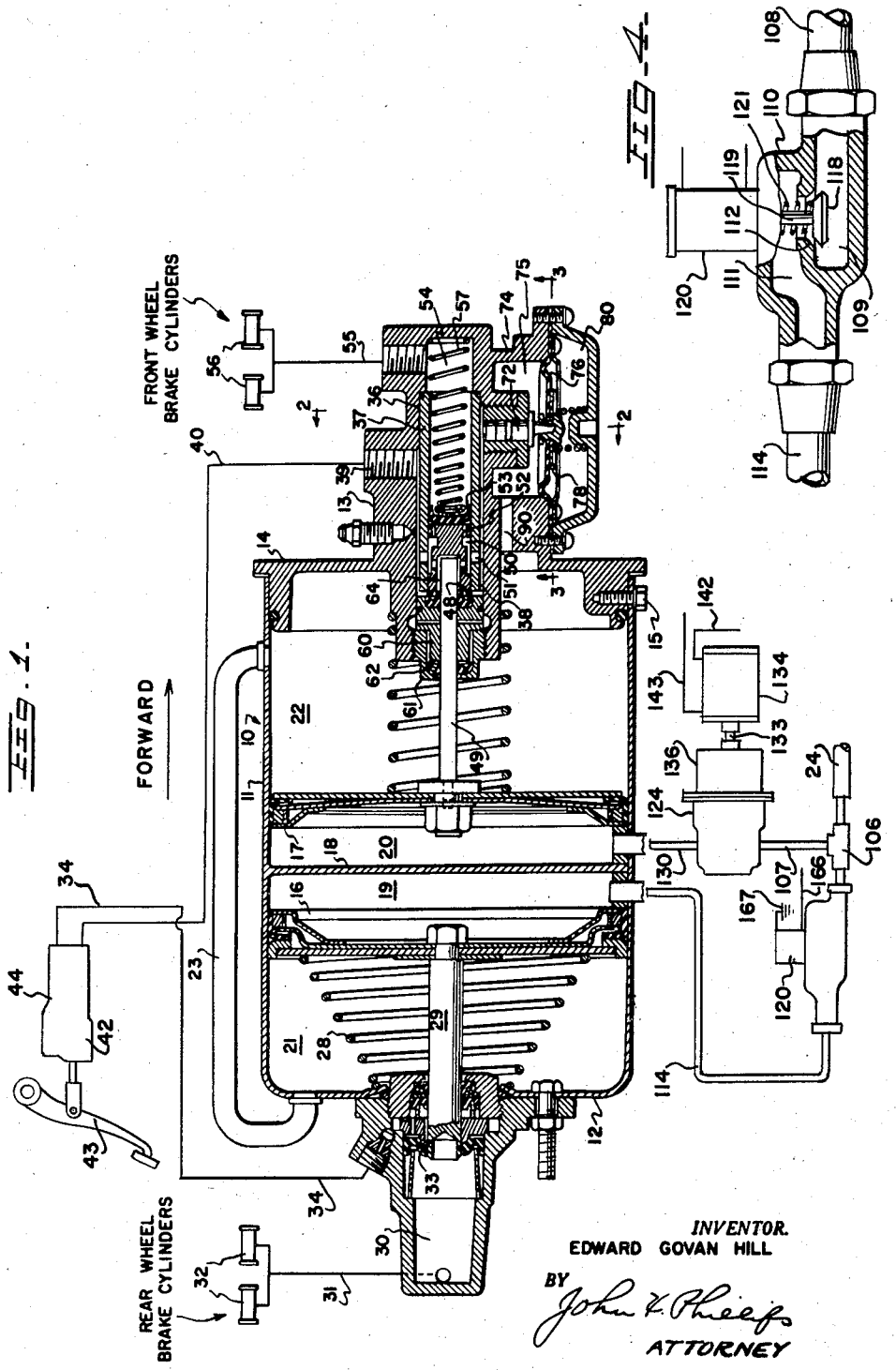

United States Patent Office 2,845,147
Patented July 29, 1958

2,845,147

BOOSTER BRAKE MECHANISM

Edward Govan Hill, Birmingham, Mich., assignor to Kelsey-Hayes Company, a corporation of Delaware Application October 13, 1955, Serial No. 540,241

9 Claims. (Cl. 188—152)

This invention relates to a booster brake mechanism, and more particularly to such a mechanism wherein the proportionate application of the front and rear brakes of a motor vehicle is automatically controlled in accordance with predetermined driving conditions.

In my copending application Serial No. 523,309, filed July 20, 1955, I have disclosed and claimed a novel type of booster brake mechanism wherein separate booster motor units are energized by a common control mechanism for supplying hydraulic fluid under pressure to the front and rear wheel cylinders, the booster motor force to the front wheel cylinders being supplemented by the pedal forces generated by the operator. In such system, the generation of hydraulic pressures supplied to the rear wheel cylinders is limited in accordance with the maximum energization of the booster motor unit associated with the rear wheel cylinders. This limitation is provided for two reasons. In the first place, it minimizes the chances of locking the rear wheels and causing them to slide, thus reducing the rear wheel braking effect because of loss of traction of the wheels. In the second place, the system provides for utilizing pedal generated pressures entirely in conjunction with the application of the front wheel brakes, which is highly desirable under many conditions because of the very great weight carried by the forward end of a vehicle.

The system of my copending application takes into account the fact that when a so-called "panic" stop is made at high vehicle speeds, it is relatively easy for the rear wheel booster motor to lock the rear wheels, which is undesirable for the reason stated. The system of the copending application therefore provides inertia controlled means operative under emergency stopping conditions for limiting the energization of the rear booster motor without affecting the front booster motor or the driver's ability to generate master cylinder pressures by operation of the foot pedal to assist in generating high pressures in the front wheel cylinders. With such a system it has been found that in emergency stops the vehicle deceleration rate can be increased as much as approximately 20%.

As is well known, modern passenger vehicles are provided with brake systems so designed that approximately 60% of the braking force is delivered to the front wheels and 40% of the rear wheels. This, of course, is because of the tremendous weight of the vehicle engine and associated parts primarily supported by the front wheels. This distribution of braking forces is necessary under many conditions and results in excessively rapid wearing of the front tires, particularly with modern high powered vehicles and under modern traffic conditions. As a matter of fact, the wearing of the front tires is sometimes uneven because of excessive braking forces used when the vehicle is turning corners. There are many conditions under which the front and rear wheel braking ratios can be equal, this particularly being true at vehicle speeds below a predetermined speed and when moderate braking is effected.

An important object of the present invention is to provide a novel type of booster brake mechanism wherein separate booster motors are employed for the front and rear wheels, as in my copending application referred to above, and wherein means are provided for effecting substantially equal braking of the front and rear wheels when the brakes are operated with comparatively moderate pedal pressures and below predetermined vehicle speeds, thus materially reducing the uneven wear of the front tire treads.

A further object is to provide such a braking mechanism wherein separate motors are employed for the front and rear wheel cylinders and wherein automatic control means is operative below a predetermined vehicle speed when the brake pedal is operated to limit the energization of the motor employed in connection with the front wheel cylinders.

A further object is to provide such an apparatus wherein the motors are of the fluid pressure operated type and wherein a single valve mechanism controls the admission of pressure fluid into the two motors, and to provide means automatically operative below predetermined vehicle speeds for limiting the admission of pressure fluid into the motor for the front wheel cylinders, thus materially liming boosted motor generated pressures in the front wheel cylinders so that the total front wheel hydraulic pressure, including that generated by the brake pedal, substantially equals the pressure generated in the rear wheel cylinders.

A further object is to provide an apparatus of the character just referred to wherein vehicle speed is utilized through a governor controlled valve mechanism for shutting off the admission of pressure fluid to the motor for the front wheel cylinders when the vehicle speed is below a predetermined point.

A further object is to provide in conjunction with such a brake system an automatic inertia control means, operative in accordance with the rate of vehicle deceleration, for rendering the governor controlled means ineffective for limiting the flow of pressure fluid to the front wheel booster motor, even below the predetermined vehicle speeds referred to, when the operator makes a so-called "panic" stop, thus providing for full utilization of braking forces to all four vehicle wheels.

A further object is to provide such a brake mechanism wherein two inertia controlled switch devices are employed, in one of which a normally closed circuit is opened when an emergency stop is made, to render inoperative the governor controlled means referred to, and the other of which is closed under emergency stopping conditions, to limit energization of the rear wheel booster motor, thus preventing the rear wheels from locking and sliding over the road surface.

Other objects and advantages of the invention will become apparent during the course of the following description.

In the drawings I have shown one embodiment of the invention. In this showing:

Figure 1 is a longitudinal sectional view through a booster mechanism, a number of the parts to be described being diagrammatically represented;

Figure 2 is a section on line 2—2 of Figure 1;

Figure 3 is an enlarged fragmentary sectional view of a portion of the booster motor mechanism and the vehicle speed controlled valve associated with the fluid line connected to the front wheel motor, parts being diagrammatically shown; and Figure 4 is a detail sectional view, parts being shown in elevation, showing the solenoid controlled valve employed for limiting energization of the rear wheel booster motor.

In Figure 1, the booster motor mechanism has been shown as a single unit, but it will become apparent that separate booster motors may be employed for the front and rear wheels. Referring to Figure 1, the single motor unit is indicated as a whole by the numeral 10 and comprises a cylinder 11 closed at one end by a preferably integral head 12. The other end of the motor is provided with a preferably die-case body 13 having a motor head 14 connected to the end of the cylinder 11 as at 15.

Within the cylinder 11 is a pair of oppositely movable pistons 16 and 17 of any desired construction. Between these pistons is a dividing wall 18 forming with the pistons a pair of variable pressure chambers 19 and 20. Between the piston 16 and head 12 is formed a constant pressure chamber 21, and a similar constant pressure chamber 22 is formed between the piston 17 and head 14. The two constant pressure chambers are connected by a pressure equalizing jumper line 23. A suitable valve mechanism for controlling energization of the motors is illustrated but forms per se no part of the present invention. Such valve mechanism is provided with a main conduit 24 which branches for communication with the variable pressure chambers 19 and 20 in a manner to be described. In the preferred embodiment of the invention, all of the four motor chambers are normally connected to a source vacuum, the motor accordingly preferably being of the vacuum suspended type. Under such conditions, the parts normally occupy the inoperative positions shown in Figure 1. Operation of the valve mechanism to be described admits air into the chambers 19 and 20 to move the pistons 16 and 17 away from each other, the admission of air into the chambers 19 and 20 being controlled under some conditions by the means described below.

The piston 16 is biased to the normal position shown by a return spring 28. The piston 16 is connected to a plunger 29 movable into a hydraulic chamber to displace fluid therefrom through conventional brake lines 31 to the rear wheel cylinders 32 of the motor vehicle. Suitable bearing and sealing means indicated as a whole by the numeral 33 surrounds the plunger 29 and forms per se no part of the present invention. The bearing and sealing means is of such character as to provide for the admission of replenishing fluid into the chamber 30 through a line 34, further referred to below.

The preferably die-cast body 13 has a bore 36 carrying therein a sleeve 37 surrounded intermediate its ends by an annular space 38 formed between the sleeve 36 and the body 13. Such space communicates through an inlet opening 39 with a hydraulic line 40 extending to a conventional master cylinder 42 having the usual operating pedal 43. A conventional master cylinder piston (not shown) displaces fluid through line 40 upon operation of the brake pedal as will be obvious. The master cylinder has the usual reservoir 44, and this reservoir is connected to the line 34.

A hydraulic cylinder is defined within the sleeve 37 and a fluid displacing plunger 48 is operable therein and adapted to be actuated by a piston rod 49 connected to the piston 17. An annular space 50 around the plunger 48 communicates through a port 51 with the space 38. Fluid from the master cylinder flows into the space 50 and thence around the lip of a cup 53 carried by the free end of the plunger 48, such flow of hydraulic fluid taking place upon initial operation of the brake pedal, as will become apparent. The plunger 48 is biased to the off position shown in Figure 1 by a spring 57.

A bearing 60 surrounds the plunger 49 and is mounted in the inner end of the body 13 (Figure 1). This bearing is maintained in position by a nut 61 having a fluid seal 62 therein. The plunger 48 is provided with a recess 64 into which the piston rod extends, and this recess is open to communication with the space 50, whereby fluid pressure back of the entire area of the plunger 48 assists the motor piston 17 in effecting pressure generating movement of the plunger 48. Such pressure fluid flows through lines 55 to the front wheel cylinders 56.

The valve mechanism illustrated forms no part per se of the present invention but forms the subject matter of the copending application of Jeannot G. Ingres, Serial No. 455,647, filed September 13, 1954.

The valve mechanism referred to is illustrated particularly in Figure 2. A nut 70 is threaded into the body 13 and forms a small cylinder 71 in which is slidable a sealed valve operating plunger 72. The upper end of the cylinder 71 as viewed in Figure 2 communicates with the space 38. An operating boss 73 is formed at the lower end of the plunger 72.

The body 13 is provided with a depending annular portion 74 having therein a vacuum chamber 75 closed at the bottom by a flexible diaphragm 76. This diaphragm carries a thimble 77 recessed in the top thereof to receive the boss 73. The thimble fixes with respect to the diaphragm centrally thereof a lever 78 arranged in a control chamber 80 formed in a closure cap 81 secured to the bottom of the body portion 74. The chamber 80 communicates through a passage 82 and elbow 83 with the fluid conduit 24 referred to above.

Radially outwardly of the chamber 75 the body 13 is provided with a vacuum chamber 86 in fixed communication with the chamber 75 through a port 87. A fitting 88 has an upstanding nipple 89 adapted to communicate through any suitable form of conduit (not shown) with a source of vacuum. It will be apparent that the vacuum chamber 75 is always in communication with the source of vacuum, and as shown in Figure 1, the chamber 75 is in fixed communication with the motor chamber 22 through a passage 90.

A valve seat is arranged in the bottom of the vacuum chamber 86 and is engageable by a hemispherical valve 93 having a depending stem provided with a nut 94 engaging against the bottom of the adjacent end of the lever 78. A light spring 95 maintains the valve 93 at its upper limit of movement relative to the lever 78. The valve 93 is normally open as shown in Figure 2, and accordingly the chambers 80 and 86 normally communicate with each other, and air will be exhausted from both motor chambers 19 and 20, as will become apparent below.

Diametrically opposite the chamber 86, the body 13 has an air inlet 98 preferably tapped for connection with a suitable air cleaner (not shown). In the bottom of the air inlet 98 is a valve seat 99 normally engaged by a ball valve 100, as shown in Figure 2. This ball valve seats on the adjacent end of the lever 78 and is urged upwardly toward closed position by a light spring 101. A compression spring 102 urges the center of the lever 78 upwardly to tend to maintain the valves 93 and 100 in the normal positions shown in Figure 2.

Referring to Figures 1 and 4, it will be noted that the end of the conduit 24 remote from the valve mechanism is connected to one end of the run of a T 106 the branch of which is connected to a pipe 107. The other end of the run of the T 106 is connected through a pipe 108 with a chamber 109 (Figure 4) formed in the bottom of a valve housing 110. This housing has an upper chamber 111 normally communicating through a valve seat 112 with the lower chamber 109. The chamber 111 communicates through a conduit 114 (Figures 1 and 4) with the motor chamber 19.

Communication between the chambers 109 and 111 is controlled by a normally open valve 118 having a stem 119 connected to or forming a part of the armature of a solenoid 120 energizable to seat the valve 118, preferably against the tension of a light spring 121 which biases the valve 118 to open position. The solenoid 120 is energized by means and under conditions to be described.

Referring to Figure 3, the numeral 124 designates a valve housing having a pair of chambers 125 and 126 normally communicating with each other through a valve seat 127. This seat is engageable by a valve 128 to be closed under conditions referred to. The valve 128 is provided with a stop member 129 to limit its movement to the open position shown in Figure 3. The pipe 107 is in fixed communication with the chamber 126, and the chamber 125 is in fixed communication with the motor chamber 20 through a pipe 130.

Against the open end of the chamber 125 is seated a diaphragm 132 connected to a stem 133 one end of which forms the stem of the valve 128 and the other end of which constitutes the armature of a solenoid 134. The peripheral portion of the diaphragm is clamped by the open end of a casing 136 in which is arranged a spring 137 biasing the valve 128 to the open position shown in Figure 3. The interior of the casing 136 is preferably vented to the atmosphere.

Current for the solenoid 134 is supplied by any suitable source of current 140 such as the vehicle battery, one side of which is grounded as at 141. The other side of the battery is connected to a wire 142 one end of which is connected to one terminal of the solenoid 134. The other terminal of this solenoid is connected to one end of a wire 143.

An inertia switch 144, preferably a mercury switch having a body of mercury 144' therein, controls energization of the solenoid 134 under some conditions. The wire 143 leads to one contact 145 of the mercury switch, and the other contact 146 of this switch is connected to one end of a wire 147 leading to a contact 148 associated with a second contact 149 grounded as at 150. A circuit across the contacts 148 and 149 is adapted to be closed when these contacts are engaged by a switch element 151 carried by any suitable type of governor 152 driven in accordance with vehicle speed. The circuit across contacts 148 and 149 is closed when the vehicle is traveling below a predetermined moderate speed. Under such conditions, the solenoid 134 will be energized to urge the valve 128 to closed position. Above such predetermined speeds, the valve 128 will always be open. Attention is invited to the fact that the solenoid circuit is normally closed across contacts 145 and 146 and is opened by the mercury switch under predetermined vehicle decelerating conditions, as referred to below. It will be noted that the casing of the mercury switch slopes upwardly and forwardly and the inclination of this switch may be adjusted by a screw 154 engaging the casing of the mercury switch and holding it downwardly to any adjusted position against the tension of a light spring 155. The mercury switch is pivoted as at 156.

A second mercury switch 160 is employed for controlling the flow of pressure fluid through the line 114. The mercury switch 160 may be identical with the switch 144 except that its contacts 161 and 162 are in the higher end of the switch and normally out of contact with the body of mercury 163 in the switch. Under predetermined vehicle decelerating conditions, the body of mercury 163 will move forwardly and bridge across the contacts 161 and 162. The contact 162 is connected to one end of the wire 142 while the contact 161 is connected by a wire 166 to one terminal of the solenoid 120, the other terminal of such solenoid being grounded as at 167.

*Operation*

The parts of the apparatus normally occupy the positions shown in Figures 1, 2 and 4. As fully described in copending application Serial No. 455,647, referred to above, the vacuum valve 93 (Figure 2) is normally open and air valve 100 is normally closed. For the reasons stated, therefore, vacuum will be present in all four of the motor chambers.

The brakes are applied by operating the pedal 43 to force fluid from master cylinder 42 through port 39 into the space 50 around the lip of the cup 53. Such fluid flows into the front wheel cylinders to move the brake shoes into engagement with the drums. Thereafter, pressure will be quickly built up to operate the valve mechanism. Increased pressure in the chamber 38 (Figure 2) will move the plunger 72 downwardly to effect similar movement of the thimble 77 against the tension of the spring 102. The air valve 100 for the moment will remain closed due to the action of the spring 101, and the right-hand end of the lever 78 in Figure 2 will move downwardly to close the vacuum valve 93. This action disconnects the vacuum chamber 86 from the lower chamber 80.

Further downward movement of the thimble 77 will result in downward movement of the left-hand end of the lever 78 in Figure 2, no further downward movement of the other end of the lever being possible because of the seating of the valve 93. The lowering of the left-hand end of the lever adjacent the air valve permits this valve to drop and air will be admitted into the chamber 80, whence it flows through conduit 24 and the associated pipe connections, further referred to in detail below, into the motor chambers 19 and 20. The pistons 16 and 17 will move away from each other, each performing its function of displacing fluid from the associated respective hydraulic chambers 30 and 54 into the rear wheel and front wheel cylinders to apply the brakes.

Assuming that the vehicle is traveling at a reasonable speed, for example 40 miles per hour, and the brake pedal 43 is depressed with a moderate amount of force, the valve 128 (Figure 3) and valve 118 (Figure 4) will be fully open for reasons which will become more apparent below. Therefore, both motor units will be fully energized by the admission of air into the motor chambers 19 and 20. Under the conditions being considered, the rear motor can be fully energized and the rear wheels will not lock and skid. The front wheel brakes will be applied by a combination of the forces generated by the piston 17 and by the foot pedal, hydraulic pressure behind the plunger 48 assisting the motor piston 17 in building up pressure in the hydraulic chamber 54.

Under the moderate vehicle speed conditions referred to above, the switch arm 151 (Figure 3) controlled by the governor will be disconnected from contacts 148 and 149 and, accordingly, the solenoid 134 will be de-energized and the valve 128 will be held open by the spring 137. Accordingly, there is no restriction to the flow of air from pipe 107 through chamber 126, valve seat 127, chamber 125 and pipe 130 into the motor chamber 20. The conditions existing as to the valve 128 and its associated elements will be as illustrated in Figure 3, the piston 17 having been moved to the right to assist in applying the front wheel brakes with the switch 151 open, the mercury 144' in the switch 144 being connected across contacts 145 and 146, and the valve 128 being open. Similarly, there will be no restriction to the flow of air between chambers 109 and 111 (Figure 4) and thence into the motor chamber 19 since the circuit for the solenoid 120 will be broken as shown in Figure 3.

Assuming that the vehicle is traveling at a relatively high speed and substantial force is applied to the brake pedal 42 to effect rapid vehicle deceleration, for example in a "panic" stop, the initial application of the brakes will effect vehicle deceleration at the predetermined rate to render the switch 160 (Figure 3) operative. Under such conditions, the inertia of the mercury 163 will cause it to move forwardly or to the right as viewed in Figure 3 to bridge across the contacts 161 and 162 to close the circuit through the solenoid 120. This action closes the valve 118 (Figure 4) and permits no more air to flow into the chamber 111 and on into the motor chamber 19. The closing of the valve 118 takes place well in advance of the establishment of atmospheric pressure in the motor chamber 19. Energization of the booster motor for the rear wheel cylinders accordingly will be arrested and the hydraulic pressure generated in the rear brake cylinders will not be sufficiently high to lock the rear wheels of the vehicle. Therefore traction of these wheels with the road will be maintained, and the rear wheel braking action will be much more effective than if higher pressures were generated in the chamber 30 and the rear wheels became locked.

At the same time, the switch 151 (Figure 3) will have been open due to the vehicle speed at which deceleration started. Accordingly, the solenoid 134 will have been deenergized and the valve 128 will be open. Therefore, full pressure will be established in the motor chamber 20 to effect full energization of the forward brake motor. The piston rod 49 thus will exert its maximum force against the plunger 48, and this force will be added to by hydraulic pressure back of the plunger, generated by the action of the foot pedal 43. The force exerted against the pedal 43 is limited only by the ability of the operator to exert such force, and accordingly a very heavy braking of the front wheels will occur and the maximum rate of vehicle deceleration will be accomplished.

The governor 152 is set to open or close the switch 151 at any desired predetermined speed, for example when the vehicle passes through a speed of approximately 28 miles per hour. Under the conditions being considered, vehicle deceleration will cause the switch 151 to close at the predetermined vehicle speed for which the governor 152 is adjusted. Assuming, however, that vehicle deceleration continues at a relatively rapid rate, the body of mercury 144', which will have been moved forwardly to open the circuit across the contacts 145 and 146, will remain forwardly of such contacts and the circuit for the solenoid 134 will remain open regardless of the closing of the switch 151. Accordingly, a rapid rate of vehicle deceleration will be maintained. Thus it will be apparent that while the valve 128 and its associated control mechanism are intended to function in the manner further described below to limit the application of the front wheel brakes, it remains ineffective for this purpose under emergency stopping conditions and accordingly the vehicle may be brought to a stop more rapidly than with any prior systems except that disclosed in my copending application Serial No. 523,309.

As previously stated, the higher ratio of front wheel braking to rear wheel braking results in rapid wear of the front tire treads, this wearing being uneven at the sides of the tires incident to applying the brakes when turning corners. The disadvantage referred to is minimized by the use of the valve 128 and its associated control mechanism.

Assuming that the vehicle is traveling below the speed for which the governor 152 is set and the vehicle is to be decelerated at a moderate rate, the foregoing operation will take place so far as the operation of the pedal and valve mechanism is concerned. Under such conditions the bodies of mercury 144' and 163 will remain in the lower ends of their tubes since the inertia developed in the bodies of mercury will not move them forwardly. Accordingly, the solenoid 134 will be energized since the switch 151 always will be closed below the speed setting for the governor 152. In this connection, it is pointed out that since the motors under normal conditions are vacuum suspended, there normally will be vacuum in the chambers 125 and 126. The force of the spring 137, plus atmospheric pressure in the spring chamber acting against the diaphragm 132, will hold the valve 128 in open position. The solenoid 134 is designed to exert a force, when energized, tending to move the diaphragm 132 and valve 128 toward the right in Figure 3, and this force will be slightly less than the force of the spring 137 tending to hold open the valve 128.

Below the vehicle speeds at which the governor 152 is set, therefore, under normal driving conditions, the solenoid 134 will be energized but the valve 128 will be held in open position by a force equal to the force of the spring 137 minus the force exerted by the solenoid 134. A moderate brake application under such conditions disconnects the chamber 80 (Figure 2) from the source of vacuum through the operation of the valve mechanism as described, and air will be admitted into the chamber 80, through conduit 24, pipe 107, chambers 126 and 125 and pipe 130, into the motor chamber 20. Pressure will accordingly rise in the chamber 125 and when this pressure, added to the force of the solenoid 134, reaches a predetermined point, the two forces added together will overcome the compression of the spring 137 and close the valve 128. No additional air can be admitted to the chamber 20 and, accordingly, the forward motor will be subject to limited differential pressures substantially below the maximum differential pressures which will be established under the emergency stopping conditions described above. The maximum energization of the motor when the valve 128 closes is determined by the relation between the compression of the spring 137 and the force developed by the solenoid 134, these two factors determining what pressure will be necessary in the chamber 125 to close the valve 128.

Thus it will be apparent that with moderate vehicle speeds and under conditions of moderate brake pedal operation, lower hydraulic pressures will be supplied to the front wheel cylinders and ordinarily the braking forces will be equally divided between the front and rear wheel cylinders. Since a very large percentage of brake applications occurs under the conditions now being considered, it will be apparent that the wearing of the front wheel tires will be greatly minimized.

Of course, there will be conditions which call for an emergency stop when the switch 151 is closed. Assuming that the vehicle is traveling below the speed of the governor setting, a heavy application of force to the brake pedal will cause rapid vehicle deceleration, this being wholly possible by the partial energization of the front wheel booster motor plus the very substantial hydraulic pressures which may be developed by the operator in depressing the brake pedal. In this connection, it will be noted that master cylinder forces are effective only as to the operation of the front wheel cylinders and, accordingly, such hydraulic pressure is far more effective than if it were divided between the front and rear wheel cylinders. A sudden forceful operation of the brake pedal will result in deceleration of the vehicle at a rate sufficient to move the body of mercury 144' forwardly to open the circuit through the solenoid 134, and this renders the spring 137 immediately effective for opening the valve 128 for a full energization of the front booster motor.

In order to render a lower vehicle deceleration rate effective for opening the circuit across the contacts 145 and 146, it is preferred that the switch 144 be tilted at a smaller angle to the horizontal than the switch 160. The inclinations of these switches may be adjusted by the screws associated therewith, as will be apparent.

The operations of the various parts of the mechanism when the brakes are released need not be described in detail since they will be apparent from the copending applications referred to above. Releasing the brake pedal releases pressure affecting the plunger 72 (Figure 2), whereupon the air and vacuum valves return to normal position and the motor will be vacuum suspended. The motor return springs will return the pistons 16 and 17 to normal position, and the plunger 48 will be returned to normal position by the spring 57. Of course, except under the decelerating conditions referred to, the bodies of mercury in the two switches 144 and 160 will remain in the lower ends of the switches to maintain the normal conditions of the circuits for the solenoids 120 and 134.

From the foregoing, it will be apparent that the control mechanism including the valve 128, the governor 152 and solenoid 134 provides means for minimizing the wearing of the front tires when normal brake operations take place below predetermined vehicle speeds. It also will be apparent that the use of the mercury switch 144 renders the solenoid 134 ineffective for closing the valve 128 under emergency stopping conditions at reasonable vehicle speeds. It also will be apparent that the mercury switch 144, operating in the same general manner as the switch 160 under emergency stops from high vehicle speeds, renders the control means for the valve 128 ineffective for preventing full application of the brakes under such conditions.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism for a motor vehicle having front and rear wheel cylinders, a pair of hydraulic chambers, separate hydraulic fluid lines connecting the respective hydraulic chambers to the front and rear wheel cylinders, booster motor means, a plunger in each hydraulic chamber connected to be operated by said booster motor means to displace fluid through said hydraulic lines, control means connected for energizing said booster motor means, said control means comprising a pedal, means connected to be operated by said pedal for assisting said motor means in transmitting a force to the plunger in the hydraulic chamber connected to the front wheel cylinders, auxiliary means connected to be subject to vehicle speed below a predetermined rate for limiting the effectiveness of said booster motor means for transmitting force to said last-mentioned plunger, and means connected to said auxiliary means and operative independently of said auxiliary means in accordance with vehicle deceleration above a predetermined rate for rendering said auxiliary means inoperative.

2. A booster brake mechanism for a motor vehicle having front and rear wheel cylinders, a first hydraulic chamber connected to the front wheel cylinders, a first plunger movable into said chamber to displace fluid therefrom, a second hydraulic chamber connected to the rear wheel cylinders, a second plunger movable into said second chamber to displace fluid therefrom, a first motor unit having a pressure responsive member connected to said first plunger, a second motor unit having a second pressure responsive member connected to said second plunger, said motor units having separate variable pressure chambers, a control valve mechanism connected to a source of fluid pressure and having separate fluid lines connected to said variable pressure chambers and connected to supply pressure fluid from said source to such chambers upon operation of said valve mechanism, a normally open valve in said one fluid line, a solenoid connected to said valve and energizable for closing it, a circuit for said solenoid comprising a switch connected to be operated below a predetermined vehicle speed for closing said circuit, and a normally closed inertia controlled switch in said circuit arranged to be opened in response to a predetermined rate of vehicle deceleration for preventing the closing of said circuit at any vehicle speed.

3. A booster brake mechanism for a motor vehicle having front and rear wheel cylinders, a first hydraulic chamber connected to the front wheel cylinders, a first plunger movable into said chamber to displace fluid therefrom, a second hydraulic chamber connected to the rear wheel cylinders, a second plunger movable into said second chamber to displace fluid therefrom, a first motor unit having a pressure responsive member connected to said first plunger, a second motor unit having a second pressure responsive member connected to said second plunger, said motor units having separate variable pressure chambers, a control valve mechanism connected to a source of fluid pressure and having separate fluid lines connected to said variable pressure chambers and connected to supply pressure fluid from said source to such chambers upon operation of said valve mechanism, inertia operated means connected in one of said fluid lines leading to the variable pressure chamber of said second motor unit and connected to be operated solely in accordance with vehicle deceleration above a predetermined point for restricting flow of pressure fluid through said one fluid line, auxiliary means connected to restrict the flow of pressure fluid through the other fluid line leading to the variable pressure chamber of said first motor unit and connected to be operated independent of said inertia operated means below a predetermined vehicle speed, and means connected to said auxiliary means and connected to render the latter inoperative below said predetermined vehicle speed when the rate of vehicle deceleration exceeds a predetermined point.

4. A booster brake mechanism for a motor vehicle having front and rear wheel cylinders, a first hydraulic chamber connected to the front wheel cylinders, a first plunger movable into said chamber to displace fluid therefrom, a second hydraulic chamber connected to the rear wheel cylinders, a second plunger movable into said second chamber to displace fluid therefrom, a first motor unit having a pressure responsive member connected to said first plunger, a second motor unit having a second pressure responsive member connected to said second plunger, said motor units having separate variable pressure chambers, a control valve mechanism connected to a source of fluid pressure and having separate fluid lines connected to said variable pressure chambers and connected to supply pressure fluid from said source to such chambers upon operation of said valve mechanism, inertia operated means connected in one of said fluid lines leading to the variable pressure chamber of said second motor unit and connected to be operated in accordance with vehicle deceleration above a predetermined point for restricting flow of pressure fluid through said one fluid line, a normally open valve in the other fluid line leading to the variable pressure chamber of said first motor unit, a solenoid connected to said normally open valve and energizable for closing such valve, and a circuit for said solenoid comprising a switch connected to be closed below a predetermined vehicle speed for closing said circuit, and a normally closed inertia switch in said circuit in series with said solenoid arranged to be opened when the rate of vehicle deceleration exceeds a predetermined point.

5. A booster brake mechanism for a motor vehicle having front and rear wheel cylinders, a first hydraulic chamber connected to the front wheel cylinders, a first plunger movable in one direction in said chamber to displace fluid therefrom, a second hydraulic chamber connected to the rear wheel cylinders, a second plunger movable in said second chamber to displace fluid therefrom, a first motor unit having a pressure responsive member connected to said first plunger, a second motor unit having a second pressure responsive member connected to said second plunger, said motor units having separate variable pressure chambers, a control valve mechanism connected to a source of fluid pressure and having separate fluid lines leading to said variable pressure chambers and connected to supply fluid from said source to such chambers upon operation of said valve mechanism, a master cylinder having a pedal, a hydraulic line connecting said master cylinder to said first hydraulic chamber back of said first plunger whereby pedal displaced fluid from said master cylinder will assist said first motor unit in displacing fluid from said first hydraulic chamber, means connected to utilize fluid flowing through said hydraulic line for operating said valve mechanism, and auxiliary means connected to restrict the flow of pressure fluid through one of said fluid lines into the variable pressure chamber of said first motor unit and connected to be operated below a predetermined vehicle speed.

6. A mechanism according to claim 5 provided with means connected to said auxiliary means and arranged to be subject to operation in response to a predetermined rate of vehicle deceleration for preventing said auxiliary means from restricting the flow of fluid through said one fluid line.

7. A mechanism according to claim 5 provided with means connected to said auxiliary means and arranged to be subject to operation in response to a predetermined rate of vehicle deceleration for preventing said auxiliary means from restricting the flow of fluid through said one fluid line, and inertia operated means connected to the other of said fluid lines leading to the variable pressure chamber of said second motor unit and arranged to be responsive to a predetermined rate of vehicle deceleration for restricting the flow of pressure fluid from said valve mechanism through said other fluid line.

8. A booster brake mechanism for a motor vehicle having front and rear wheel cylinders comprising a pair of hydraulic chambers, separate hydraulic fluid connections between said chambers and said front and rear wheel cylinders, a pair of differential fluid pressure operated motors each having a pressure responsive unit, a plunger movable in each hydraulic chamber and connected to one of said pressure responsive units, each motor having a variable pressure chamber, a valve mechanism connected to sources of relatively high and low pressures, fluid lines connecting said valve mechanism to said variable pressure chambers, a normally open valve in one of said fluid lines, means biasing such valve to open position to maintain the associated variable pressure chamber in communication with said valve mechanism whereby operation of said valve mechanism will disconnect said last-mentioned variable pressure chamber from said low pressure source and connect it to said high pressure source, a normally de-energized solenoid connected to said valve, and a circuit for said solenoid comprising a governor operated switch normally closed when the vehicle speed is below a predetermined point, and a normally closed inertia operated switch in series with said first named switch adapted to be opened when the rate of vehicle deceleration increases to a predetermined point.

9. A mechanism according to claim 8 wherein said last-mentioned variable pressure chamber is associated with the motor which operates to displace fluid into the front wheel cylinders, a casing forming a part of said one fluid line, and a diaphragm carried by said casing and having one side open to said one fluid line, the opposite side of said diaphragm being open to said source of high pressure.

References Cited in the file of this patent

UNITED STATES PATENTS

| | | |
|---|---|---|
| 2,192,021 | Weeks | Feb. 27, 1940 |
| 2,235,112 | Pulaski | Mar. 18, 1941 |
| 2,283,713 | Wolf | May 19, 1942 |
| 2,373,272 | Stelzer | Apr. 10, 1945 |
| 2,747,697 | Banker | May 29, 1956 |